June 3, 1952  A. E. KONICK ET AL  2,598,922
TWO-PHASE MOTOR CONTROL SYSTEM
Filed Jan. 31, 1950

Inventors
Arthur E. Konick &
Norman E. Hjorth
By
Attorney

Patented June 3, 1952

2,598,922

UNITED STATES PATENT OFFICE 2,598,922

TWO-PHASE MOTOR CONTROL SYSTEM

Arthur E. Konick, Collingswood, and Norman E. Hjorth, Audubon, N. J., assignors to Radio Corporation of America, a corporation of Delaware Application January 31, 1950, Serial No. 141,488

7 Claims. (Cl. 318—20)

This invention relates to improvements in control systems for two-phase induction motors, and particularly to the improvement of control systems of the general type described in U. S. Patent 2,411,608—Lesnick.

In the above-mentioned Lesnick patent, there is described a two-phase motor control system wherein the motor current is controlled by transformer primary windings which are connected to form a bridge network, with the transformer secondary windings being shunted by electronic tubes, the arrangement being such that the relative phase and magnitude of the motor current is a function of the transformer currents as determined by the conductivities of the tubes. For simplicity, such a system will be referred to herein as a transformer-bridge motor control system.

While the control system just described has many advantageous features, it has been found that the use of self-bias for the control tubes limits the amplification of the system to a point below that desired in some instances. On the other hand, the use of a separate source of unidirectional bias voltage is not entirely satisfactory, since it is not responsive to changes in the level of the control signal and requires an additional power supply unit.

It is, accordingly, a principal object of the present invention to provide an improved transformer-bridge control system for two-phase induction motors in which the foregoing and other disadvantages are substantially reduced or eliminated.

Another object of the invention is to provide an improved control system of the type described and having greater amplification than similar prior art systems.

A further object of the invention is to provide an improved transformer-bridge control system in which the use of self-bias is avoided.

In accordance with the invention, the foregoing and other related objects and advantages are attained by applying to the grid circuits of the control tubes alternating bias voltages which will vary in response to variations in the conductivities of the tubes in a manner to provide a positive feedback effect on the tubes.

Figure 1:
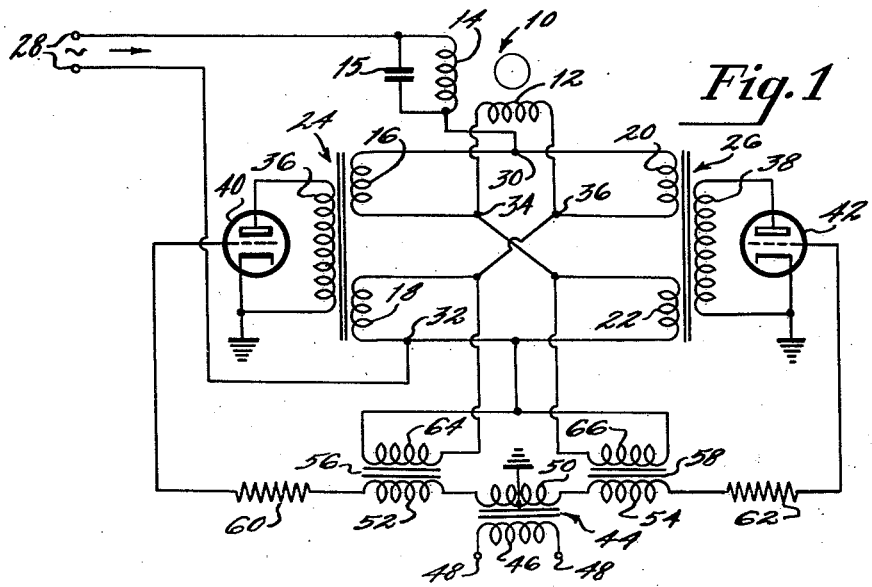
Figure 2:
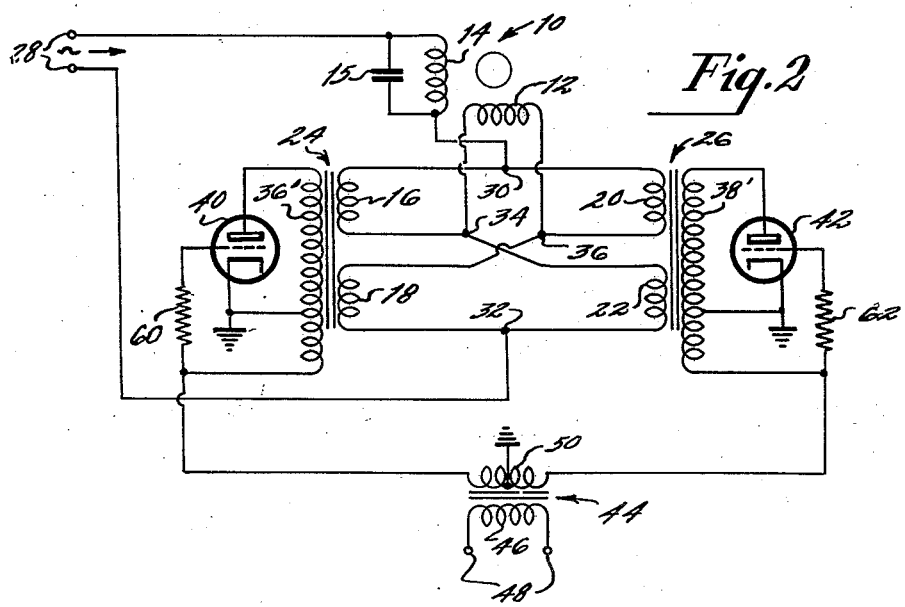

A more complete understanding of the invention can be had from the following description of illustrative embodiments thereof, when considered in connection with the accompanying drawings wherein:

Figure 1 is a schematic diagram of a two-phase motor control system arranged in accordance with the present invention, and Figure 2 is a schematic diagram of a modified form of two-phase motor control system arranged in accordance with the invention.

Referring to Fig. 1 of the drawing, there is shown a two-phase induction motor 10 provided with field windings 12, 14. The field windings 12, 14 are connected through the primary windings, 16, 18 and 20, 22, of two transformers, 24 and 26, respectively, to a pair of alternating voltage input terminals 28. The primary windings 16, 18, 20, 22 are connected in a bridge circuit having conjugate pairs of terminals 30, 32 and 34, 36. The motor winding 12 is connected across the bridge at the terminals 34, 36, while the motor winding 14 is shunted by a phasing capacitor 15 and is connected to the input terminals 28 in series with the bridge.

The transformer secondary windings, 36 and 38, are connected in the anode-cathode circuits of a pair of electronic tubes, 40 and 42, respectively, so that alternating voltages induced in the secondary windings 36, 38 will be applied across the tubes 40, 42 and will cause current to flow therein in an amount determined by the grid voltages thereof at any given instant.

As thus far described, the network of Fig. 1 corresponds generally to that shown in the abovementioned Lesnick patent. An alternating voltage applied to the input terminals 28 will cause current to flow through the motor winding 14 and through the transformer primary windings 16—22, while voltages induced in the secondary windings 36, 38 will cause current to flow therethrough and through the tubes 40, 42. As long as the bridge is balanced, no current will flow through the motor winding 12, and the motor 10 will not operate. However, the impedance of the primary windings 16—22 will be a function of the current flowing in the secondary windings 36, 38, and this, in turn, will be a function of the conductivities of the tubes 40, 42 as determined by the grid voltages thereof. Thus, the motor 10 can be controlled by applying suitable oppositely phased control voltages to the grids of the tubes 40, 42.

In accordance with the present invention, alternating control voltages are to be applied to the tubes 40, 42 through a transformer 44, the primary winding 46 of which is provided with a pair of input terminals 48. The secondary winding 50 of the transformer 44 has its terminals connected to the grids of the tubes 40, 42 through the secondary windings, 52 and 54, of a pair of transformers, 56 and 58, respectively. Grid resistors, 60 and 62, are provided for limiting the grid current of the tubes, 40 and 42, respectively, during positive half cycles of grid voltage.

The purpose of the transformers 56, 58 is to furnish alternating bias voltages to the tubes 40, 42, and the magnitudes of these bias voltages are regulated to have a positive feedback effect on the tubes 40, 42, as will be described. In the modification of the invention shown in Figure 1, the transformer primary windings 64, 66 are connected in parallel with the primary windings 18, 22 in the bridge network, and the connections are so arranged that the voltages supplied to the tube grids through the transformers 56, 58 will be out of phase with the voltages supplied to the tube anodes through the transformers 24, 26. Accordingly, during each positive half cycle of anode voltage on the tubes 40, 42, a negative half cycle of voltage will be applied to the tube grids, thereby tending to prevent the flow of tube current in the absence of a control signal at the input terminals 48 of the transformer 44.

For the sake of simplicity, it will be assumed that a control signal applied to the terminals 48 is exactly in phase with one of the tube anode voltages (and, consequently, 180° out of phase with the other tube anode voltage). It is evident that the control voltage across half of the secondary winding 50 will add to the alternating grid voltage on one of the tubes, say, the tube 40, and will subtract from the grid voltage for the other tube 42. Consequently, the current in the tube 40 for which these two grid voltages are additive will be reduced even more than it would be without the control voltage, while the cancelling effect of the two voltages on the grid of the other tube 42 will cause an increase in the anode current thereof. These changes in the conductivity of the control tubes 40, 42 will, of course, result in an increase in the average current through the secondary winding 38, and a decrease in the average current through the secondary winding 36, thereby decreasing the effective impedances of the primary windings 20, 22 and causing the bridge to become unbalanced. This will allow current to flow through the motor winding 12 and the motor 10 will begin to rotate. If the relative phase of the control voltage applied to the terminals 48 were to be reversed, it is evident that the foregoing sequence of operations would also be reversed, so that the bridge would be unbalanced in the opposite sense, reversing the effect on the motor 10 and causing it to rotate in the opposite direction.

At the same time that the foregoing sequence of operations is taking place, it can be seen that the impedances of the primary windings 64, 66 of the auxiliary transformers 56, 58 also will vary to some extent in accordance with the variations in the impedances of the windings 18, 22. Moreover, these variations in the impedances of the windings 64, 66 will be in such a direction that an increase in the current through one of the control tubes, say, the tube 42, will cause a decrease in the biasing voltage applied to the grid thereof by the transformer 58. Consequently, the tube current will increase to a still greater extent than it would have without the positive feedback action just described, and the amplification of the system will be increased. A similar effect will take place with respect to the other control tube 40, although in the opposite direction in the case just outlined; i. e., the bias voltage on the tube 40 will increase, thereby decreasing the current flow therein.

It will be evident from the foregoing that the control system shown in Fig. 1 will provide for the tubes 40, 42 proper biasing voltages which do not tend to increase as tube current increases, but, on the contrary, are decreased by the positive feedback action of the network.

In Figure 2, there is shown an alternative embodiment of the invention, corresponding generally to that shown in Figure 1, except that in the system shown in Fig. 2, the alternating bias voltage for the tube grids is obtained by providing tapped secondary windings 36', 38' for the transformers 24, 26. In this case, only part of the secondary windings 36', 38' are connected in the tube anode-cathode circuits, and the remaining portion of each secondary winding is connected to the grid of the tube associated therewith to furnish an alternating bias voltage thereto. Thus, the windings 36', 38' function somewhat as autotransformers, and provide the desired positive feedback effect on the bias voltages which are derived therefrom.

It will be understood that the control voltage applied to the terminals 48 can be derived from any desired source, typical examples of which are shown in the above-mentioned Lesnick patent. Also, it should be noted that although the smoothest control will be obtained when the control voltage at the terminals 48 is exactly in phase with the alternating bias voltage on the tube grids and exactly 180° out of phase with the other tube voltages, this relationship is not essential to a successful practice of the invention since an alternating voltage which is not exactly 90° out of phase with the anode voltages always will have a component either in phase or 180° out of phase with these anode voltages, and such components will serve the desired purpose.

While two specific embodiments of the invention have been shown and described, it will be appreciated that these embodiments are susceptible of some modification within the scope and spirit of the invention. Consequently, the foregoing is to be construed as illustrative and not in a limiting sense.

What is claimed is:

1. In a two-phase motor control system of the type comprising two transformers each having a pair of primary windings and a secondary winding with said primary windings being interconnected to form a bridge circuit and with said secondary windings being connected one in each of the anode-cathode circuits of a pair of grid-controlled electron discharge tubes and wherein the field windings of said motor are connected one in series with said bridge and the other between a pair of conjugate terminals of said bridge, the improvement which comprises an additional pair of windings connected one between the grid and the cathode of each said tube and each electro-magnetically coupled to one of said transformer secondary windings whereby to provide to said grids alternating bias voltages out of phase with said anode voltages and to decrease said bias voltages in response to an increase in the current flowing through said tubes.

2. A control system for a two-phase motor of the type having two field windings, said system comprising a pair of terminals adapted to be connected to a source of alternating voltage, two transformers each having a pair of primary windings and a secondary winding, said primary windings being interconnected to form a bridge having two conjugate pairs of terminals, connections from one of said pairs of conjugate terminals to one of said field windings, a series circuit connecting the other of said conjugate pairs of terminals to said input terminals and including the other of said field windings, a pair of electronic tubes each having an anode, a cathode and a control grid, said tubes being connected with their anode-cathode circuits one in parallel with each of said secondary windings, means for applying a variable alternating control voltage in opposite phase to said control grids, windings coupling said tube control grids to said transformer windings for applying to said tube control grids alternating bias voltages of phase opposite to the anode-cathode voltages on said tubes, and means including said transformer secondary windings for decreasing said alternating bias voltages in response to current flow within the tube to which each said bias voltage is applied.

3. A control system as defined in claim 2 wherein said couplings include a pair of auxiliary transformers each having primary and secondary windings, said auxiliary transformer primary windings being connected in parallel each with a primary winding of a separate one of said first-named transformers, and said auxiliary transformer secondary windings being connected each to a separate one of said tube grids.

4. A control system as defined in claim 2 wherein said transformer secondary windings comprise tapped windings and wherein said couplings each comprise a connection from each tube grid to the secondary winding of the transformer associated therewith.

5. A system for controlling a two-phase motor of the type having two field windings, said system comprising a pair of input terminals for coupling said system to a source of alternating voltage, a pair of grid-controlled electronic tubes, means including a pair of transformers coupling said tubes to said terminals to apply alternating anode voltages to said tubes upon connection of said terminals to said source, means coupling said tubes to said windings through said transformers to control the relative magnitudes and phases of the currents in said windings as a function of the relative conductivities of said tubes, means for applying variable alternating voltage to said tube grids in opposite phase to vary the conductivities of said tubes in opposite directions, means for applying to said tube grids alternating bias voltages of phase opposite to the alternating anode voltages on said tubes, and means including said transformers for decreasing the amplitude of each said bias voltage in response to an increase in the current through the tube to which said bias voltage is applied.

6. In a two-phase motor control system of the type comprising two transformers each having a pair of primary windings and a secondary winding with said primary windings being interconnected to form a bridge circuit and with said secondary windings being connected one in each of the anode-cathode circuits of a pair of grid-controlled electron discharge tubes and wherein the field windings of said motor are connected one in series with said bridge and the other between a pair of conjugate terminals of said bridge, the improvement which comprises a pair of auxiliary transformers having primary and secondary windings, each said auxiliary primary winding being connected in parallel with a primary winding of a separate one of said first named transformers, and each said auxiliary transformer secondary winding being connected to the grid of a separate one of said tubes.

7. A control system for a two-phase motor of the type having two field windings, said system comprising a pair of terminals adapted to be connected to a source of alternating voltage, two transformers each having a pair of primary windings and a tapped secondary winding, said primary windings being interconnected to form a bridge having two conjugate pairs of terminals, connections from one of said pairs of conjugate terminals to one of said field windings, a series circuit connecting the other of said conjugate pairs of terminals to said input terminals and including the other of said field windings, a pair of electronic tubes each having an anode, a cathode and a control grid, a portion of each said secondary winding being connected in the anode-cathode circuit of a separate one of said tubes, means for applying a variable alternating control voltage in opposite phase to said control grids, and a connection from each said secondary winding at a point external to said winding portion to the control grid of the tube associated therewith.

ARTHUR E. KONICK.
NORMAN E. HJORTH.

REFERENCES CITED

The following references are of record in the file of this patent:

UNITED STATES PATENTS

| Number | Name | Date |
| --- | --- | --- |
| 2,411,607 | Wolfner, 2d | Nov. 26, 1946 |
| 2,411,608 | Lesnick | Nov. 26, 1946 |
| 2,429,257 | Bond | Oct. 21, 1947 |